United States Patent [19]

Lee

[11] Patent Number: 5,911,031

[45] Date of Patent: Jun. 8, 1999

[54] IC CARD MEMORY FOR RECORDING AND REPRODUCING AUDIO AND/OR VIDEO DATA CONCURRENTLY OR SEPARATELY AND A CONTROL METHOD THEREOF

[75] Inventor: Young-Man Lee, Suwon, Rep. of Korea

[73] Assignee: Samsung Electronics Co., Ltd., Kyungki-Do, Rep. of Korea

[21] Appl. No.: 08/639,949

[22] Filed: Apr. 26, 1996

[30] Foreign Application Priority Data

Apr. 27, 1995 [KR] Rep. of Korea ............... 95/10182

[51] Int. Cl.⁶ .................... H04N 5/91; H04N 5/225
[52] U.S. Cl. ................. 386/77; 386/117; 386/107
[58] Field of Search ................ 386/77, 46, 96, 386/107, 117, 38, 39, 120; H04N 5/91, 5/225

[56] References Cited

FOREIGN PATENT DOCUMENTS

| | | | |
|---|---|---|---|
| A2 2020718 | 5/1987 | European Pat. Off. ........ | G06F 15/40 |
| A2248707 | 4/1992 | United Kingdom ............ | G06F 12/00 |
| A2294562 | 5/1996 | United Kingdom ............ | G06F 12/00 |

*Primary Examiner*—Robert Chevalier
*Attorney, Agent, or Firm*—Sughrue, Mion, Zinn, Macpeak & Seas, PLLC

[57] ABSTRACT

In an apparatus and method for recording and playing back audio and video data using an IC card memory as a recording medium, the apparatus is composed of an index region in which card attributes and miscellaneous intrinsic card data are recorded, a mode code region in which data for setting a recording or a playback type of chapter is recorded, a chapter pointer in which the address where each chapter starts in a memory region is recorded, and a data region in which the actual data of each chapter is stored. The method includes the steps of selecting a predetermined chapter and recording mode, recording a code of the selected mode in the mode address of the selected chapter, recording a starting address of the chapter in a pointer address if a recording key input is detected, recording a mode monitoring code in the starting address and recording data corresponding to the subsequent addresses, and recording data indicating the end of the chapter if data input is completed. Therefore., the apparatus and method according to the present invention can record and play back audio and/or video data concurrently or separately.

6 Claims, 5 Drawing Sheets

1

IC CARD MEMORY FOR RECORDING AND REPRODUCING AUDIO AND/OR VIDEO DATA CONCURRENTLY OR SEPARATELY AND A CONTROL METHOD THEREOF

BACKGROUND OF THE INVENTION

The present invention relates to an apparatus and method for recording and playing back audio and video data using an IC card memory as a recording medium. More particularly, the invention relates to an apparatus and method for recording and playing back audio and/or video data concurrently or separately.

FIG. 1 is a block diagram of a general apparatus for recording and playing back audio and video using an IC card memory as a recording medium, in which analog video and audio signals VI and AV are input to video and audio recording processors 3 and 4, respectively. The processing result is recorded in an IC card memory 5. At this time, controlling operations are performed such that a controller 9 sets control lines C1 through C4 depending on input conditions of a playback switch PS, a recording switch RS, and a mode switch MSS. If playback switch PS is turned on, controller 9 reads out the content recorded in IC card memory 5 and applies the selected video or audio data, according to the mode, to video or audio playback processor 6 or 7.

The conventional audio and video recording apparatus having the aforementioned configuration should concurrently record video and audio data, but cannot record only audio data or only still picture data.

SUMMARY OF THE INVENTION

Therefore, it is an object of the present invention to provide an IC card memory which can record and reproduce audio and/or video data concurrently and separately, and a control method thereof.

To accomplish the above object, according to a first aspect of the present invention, there is provided a method for recording audio and video data using an IC card memory, having a mode code region with data for setting a recording or a playback type of chapter, as a recording medium. The method comprises the steps of: selecting a predetermined chapter and a recording mode; recording a code of the selected mode in the mode address of the selected chapter; recording a starting address of the chapter in a pointer address if a recording key input is detected; recording a mode monitoring code in the starting address and recording data in the subsequent addresses; and recording data indicating the end of the chapter to the last address if data input is complete.

To accomplish the above object, according to a second aspect of the present invention, there is provided a method for recording audio and video data using an IC card memory, having a mode code region with data for setting a recording or a playback type of chapter, as a recording medium. The method comprises the steps of: selecting a predetermined chapter; reading a recording mode address of the selected chapter to determine a mode; generating a video, an audio or a composite latch enabling signal in accordance with the determined mode; and outputting video, audio or composite data in response to the latch enabling signal.

BRIEF DESCRIPTION OF THE DRAWINGS

The above objects and advantages of the present invention will become more apparent by describing in detail a preferred embodiment thereof with reference to the attached drawings, in which.

DETAILED DESCRIPTION OF THE INVENTION

Figure 1:
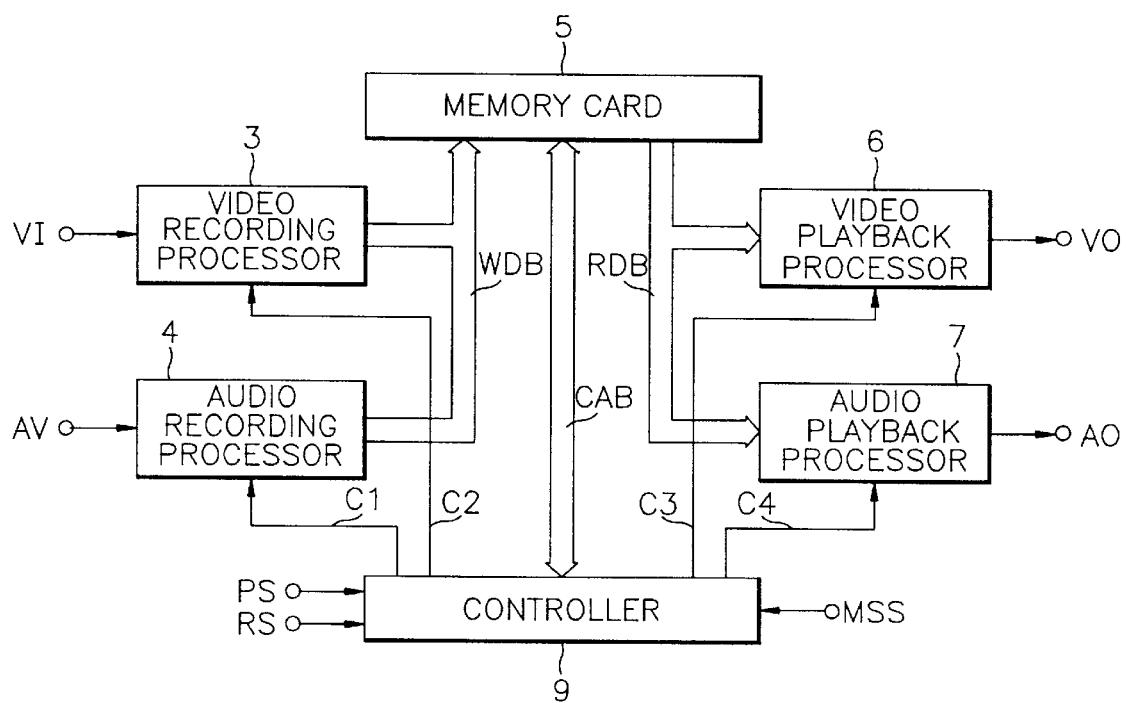
FIG. 1 is a general block diagram of an apparatus for recording and playing back audio and video using an IC card memory as a recording medium.

It should be noted that like reference numerals and letters are used to designate like or equivalent elements throughout the drawings. Also, certain specifications, such as components of a detailed circuit, shown in the following explanation are supplied for the sake of comprehensively illustrating the present invention. However, it would be obvious to one having ordinary skill in the art that the present invention can be embodied without such specifications. In explaining the present invention, the detailed explanation of related well-known functions or components, which are not necessary to explain the present invention, will be omitted.

In a first embodiment, a mode code for prescribing the characteristics of input data is generated. More specifically, a first mode code for recording only video data is 0000H. A second mode code for recording only audio data is 0001H. A third mode code for recording both video and audio data is 0002H. In this manner, if a mode is set by a mode switch MSS, a controller 9 generates the mode code and records the same in an IC card memory 5.

Figure 2:
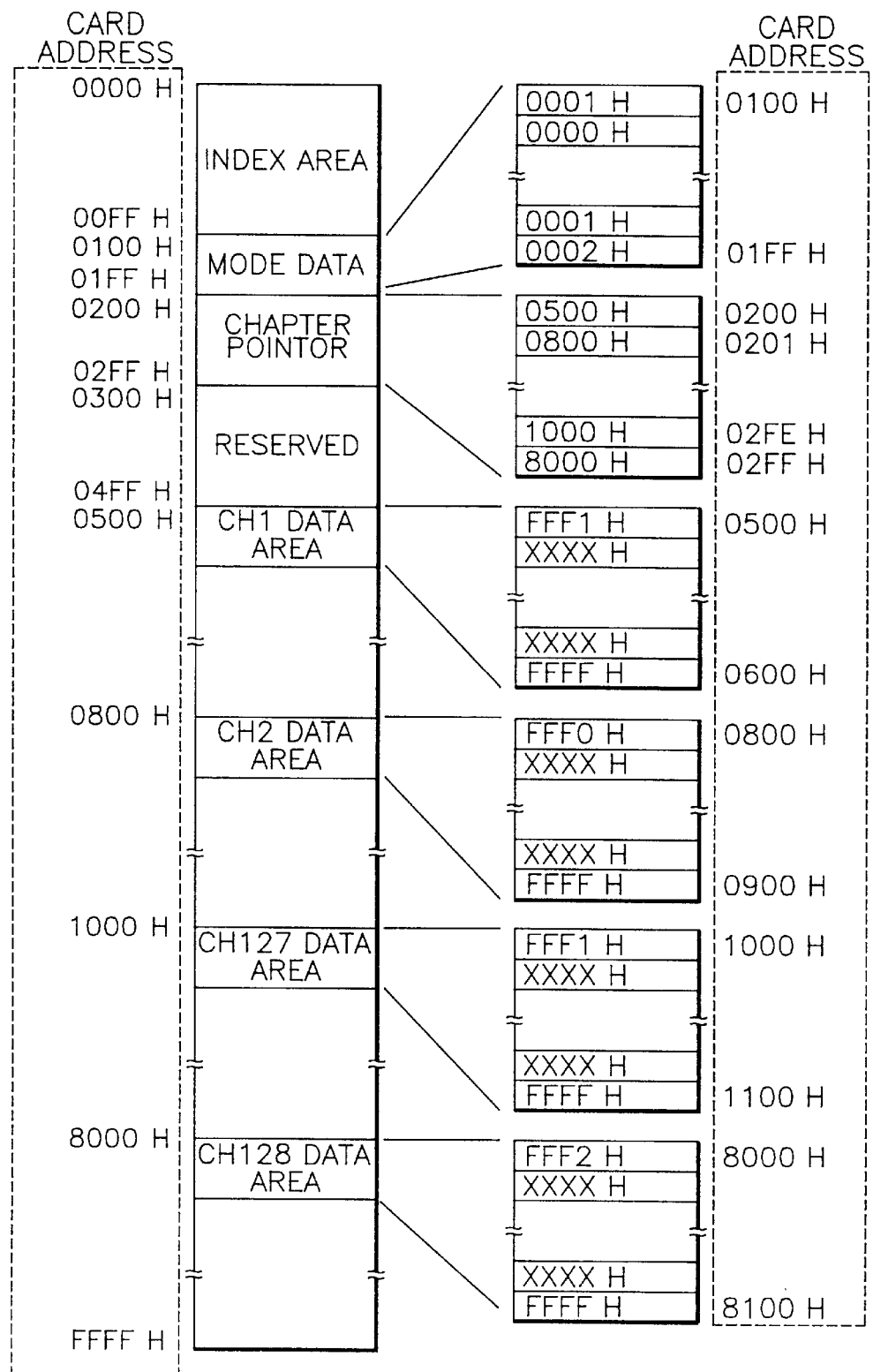
FIG. 2 is a schematic diagram of a data map within an IC card memory according to the present invention.

FIG. 2 is a schematic diagram of a data map within an IC card memory 5 according to the present invention. First, in view of an overall memory, addresses corresponding to 0000H to FFFFH are set. The setting may be varied depending on the attributes of the card. Here, the region ranging from 0000H to 00FFH is an index region, in which information data such as card size, maker, manufacturing year, recording time or recording date is recorded. The index region contains the attributes of a card and miscellaneous information which are not relevant to the audio or video data. Next, the region ranging from 0100H to 01FFH is a region where mode codes are recorded. In this embodiment, since the number of total chapters is limited to 128, the mode codes corresponding to the respective chapters are also limited to 128. Here, a chapter, which is a recorded data unit, represents the data of one cycle of an executed recording operation. The mode code of a first chapter is recorded in an address 0100H and the mode code of a second chapter is recorded in an address 0101H. In this manner, if a chapter is mapped in an address, and the address is increased for the next chapter, the mode code of chapter 128 is recorded in the address 01FFH. The next region, ranging from 0200H through 02FFH, are pointer addresses corresponding to respective chapters. These pointer addresses indicate where data for each chapter starts in the memory region. A pointer address code of a first chapter is recorded in an address 0200H, and a pointer address code of a second chapter is recorded in an address 0201H. In this manner, if a chapter is mapped in an address, and the pointer address is increased for the next chapter, the pointer address code of chapter 128 is recorded in the address 02FFH. The next addresses, 0300H through 04FFH, correspond to a reserve region and is supplied for a user's optional use. The actual audio and video data are recorded from an address 0500H. For example, in this embodiment, the first chapter starting address data included in the pointer address 0200H of the first chapter is 0500H.

Figure 3:
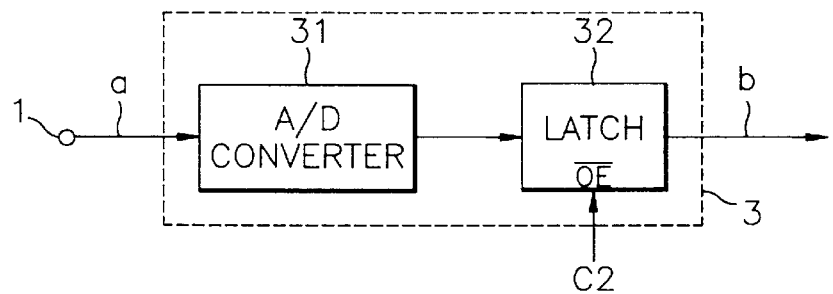
FIG. 3 is a detailed schematic diagram of a video recording processor according to the present invention.

FIG. 3 is a detailed schematic diagram of a video recording processor 3 shown in FIG. 1, in which reference letter a represents an analog video signal, which is converted into a digital video signal by an analog-to-digital (A/D) converter 31. Next, the digital video signal is input to a latch 32. A signal which enables latch 32 is a second enabling control signal C2 output from a controller 9. If the second enabling control signal C2 is low, the digital video signal is input to an IC card memory 5 through a bus b. If the second enabling control signal C2 is high, latch 32 does not generate a digital video signal. Thus, there is no input for IC card memory 5.

Figure 4:
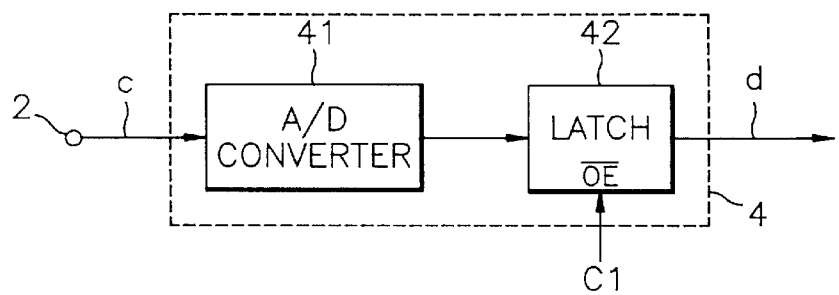
FIG. 4 is a detailed schematic diagram of an audio recording processor according to the present invention.

FIG. 4 is a detailed schematic diagram of an audio recording processor 4 shown in FIG. 1, in which reference letter c represents an analog audio signal, which is converted into a digital audio signal by an A/D converter 41. Next, the digital audio signal is input to a latch 42. A signal which enables latch 42 is a first enabling control signal C1 output from controller 9. If the first enabling control signal C1 is low, the digital audio signal is input to IC card memory 5 through a bus d. If the first enabling control signal C1 is high, latch 42 does not generate a digital audio signal. Thus, there is no more input for IC card memory 5.

Figure 5:
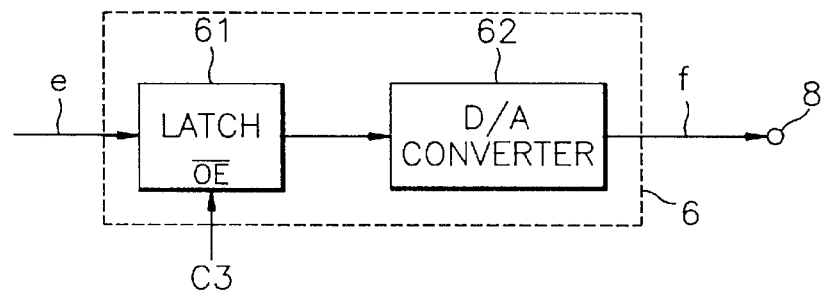
FIG. 5 is a detailed schematic diagram of a video playback processor according to the present invention.

FIG. 5 is a detailed schematic diagram of a video playback processor shown in FIG. 1, in which reference letter e represents a digital video signal, which is input to a latch 61. A signal which enables latch 61 is a third enabling control signal C3 output from controller 9. If the third enabling control signal C3 is low, the digital video signal is converted into an analog video signal by a digital-to-analog (D/A) converter 62. If the third enabling control signal C3 is high, the digital video signal is not input to D/A converter 62. Thus, there is no reproduced signal.

Figure 6:
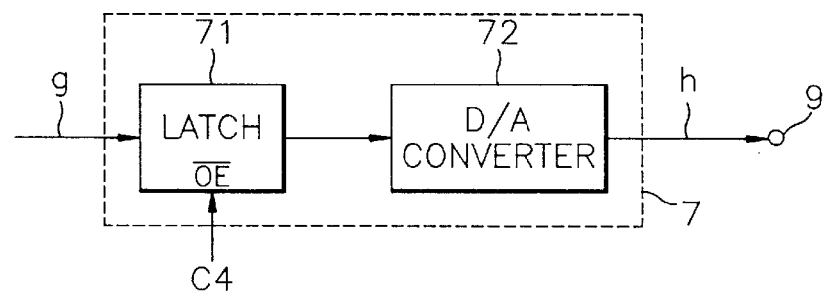
FIG. 6 is a detailed schematic diagram of an audio playback processor according to the present invention.

FIG. 6 is a detailed schematic diagram of an audio playback processor 7 shown in FIG. 1, in which reference letter g represents a digital audio signal, which is input to a latch 71. A signal which enables latch 71 is a fourth enabling control signal C4 output from controller 9. If the fourth enabling control signal C4 is low, the digital audio signal is converted into an analog audio signal by a D/A converter 72. If the fourth enabling control signal C4 is high, the digital audio signal is not input to D/A converter 72. Thus, there is no more reproduced signal.

Figure 7:
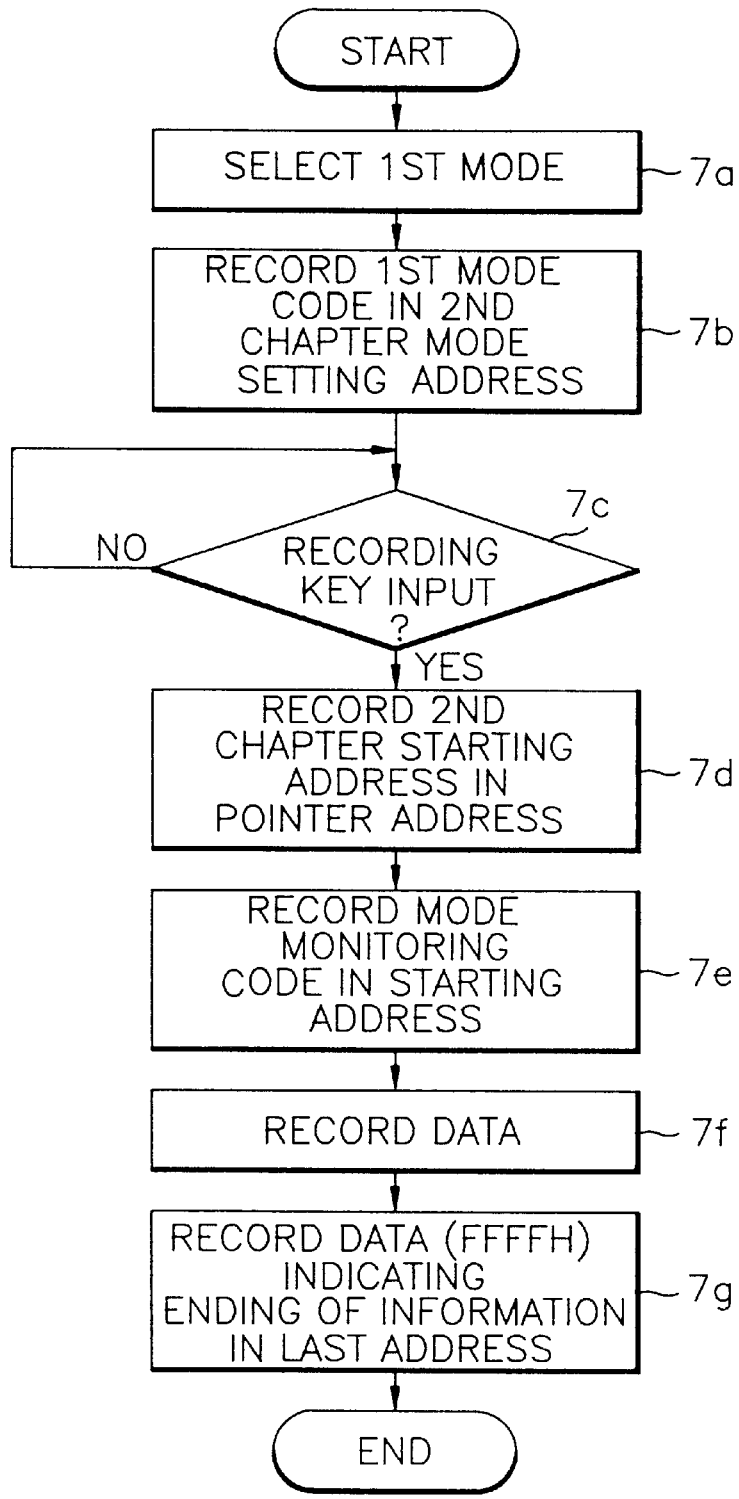
FIG. 7 is a flowchart showing the process of recording data in a memory card according to the present invention.

FIG. 7 is a flowchart showing the process of recording data in a memory card according to the present invention. First, a chapter to be recorded is checked and a mode switch MSS is adjusted to set a mode (step 7a). In this embodiment, it is assumed that a first mode and a second chapter are selected. In this manner, if the first mode and the second chapter are selected, controller 9 records 0000H in the mode code region of the second chapter, i.e., address 0101H (step 7b). Thereafter, if it is detected that a recording key is input (step 7c), a starting address of a memory where the data of the second chapter is to be recorded is recorded in the chapter pointer (step 7d). If the first chapter is recorded from address 0500H to 07FFH, controller 9 recognizes that the starting address of the second chapter is address 0800H, and writes 0800H in the pointer address 0201H corresponding to the second chapter. Right after the recording in the pointer is completed, the recording of video data starts. In other words, the second latch out enabling signal C2 is generated, and the actual data is recorded in IC card memory 5. At this time, a first mode code FFF0 is written in the first address where the actual data is recorded, i.e., address 0800H, which is a monitoring code for monitoring whether the code set by the mode code corresponds to the data of the actual data recorded region (step 7e). The mode monitoring code functions to record data as the first mode of FFF0 before recording video data, in the event that the mode codes positioned from the address 0100H to the address 01FFH are erased. Here, FFF1 is given as the second mode, and FFF2 is given as the third mode. In this manner, the monitoring code is recorded in the first address where the actual data is recorded, and the actual data is recorded starting from the second address, i.e., address 0801H. From this time, input data are sequentially recorded until data input stops. Then, data FFFF is inserted in the last address of the corresponding chapter, indicating that the chapter has ended. Then, the recording for the second chapter is terminated. (steps 7f and 7g).

Figure 8:
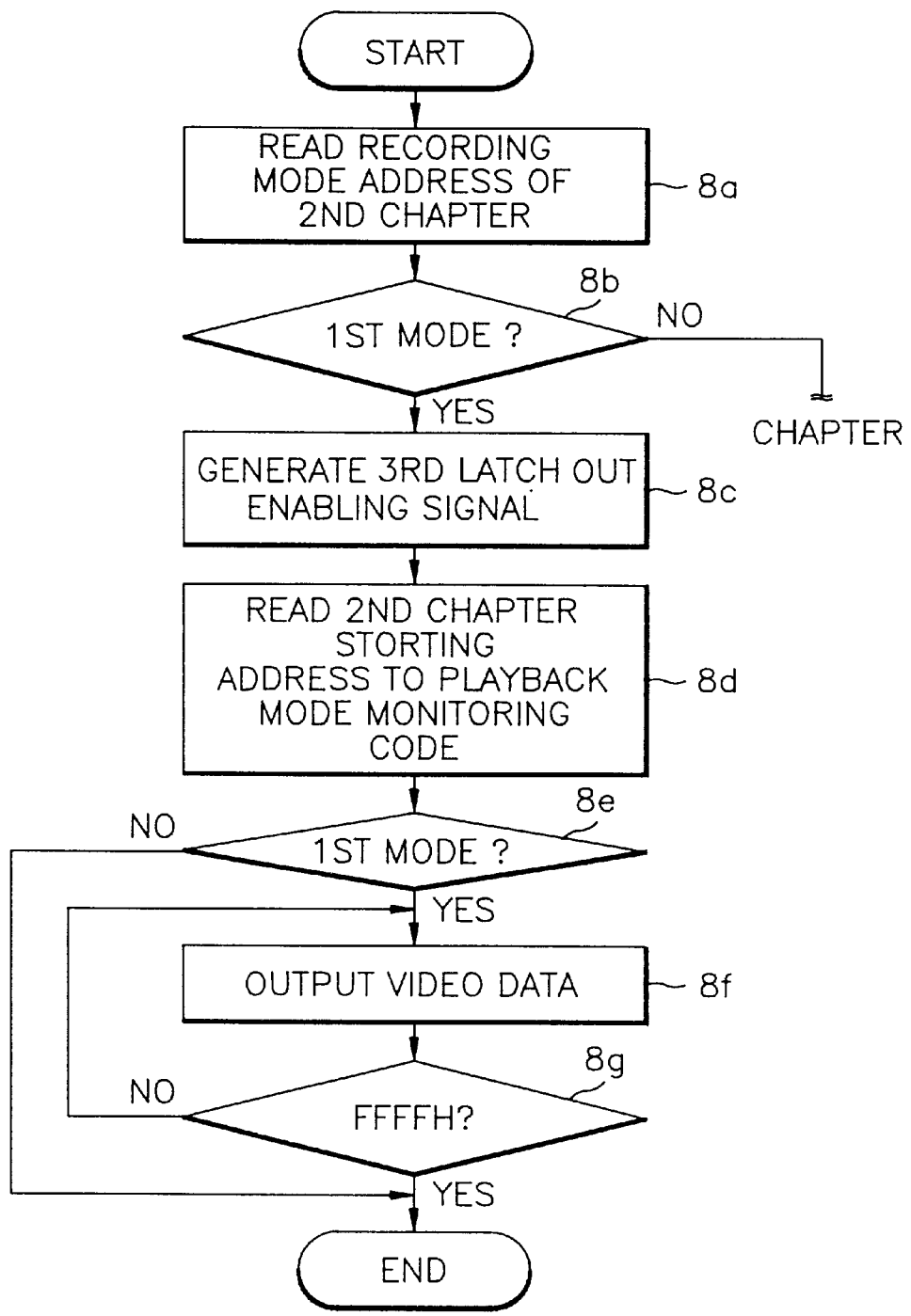
FIG. 8 is a flowchart showing the process of playing back data from a memory card according to the present invention.

FIG. 8 is a flowchart showing the process of playing back data from a memory card according to the present invention, which is for the case that the data recorded onto the second chapter is read out. First, controller 9 designates the second chapter, and the mode code of the second chapter is checked. Controller 9 searches the mode code data region of the second chapter to detect the code (steps 8a and 8b). In this embodiment, it is assumed that the first mode is selected. The mode code for the chapter will be confirmed to be 0000H. Therefore, controller 9 outputs the third enabling control signal C3 in low state to turn on latch 61 and outputs the other control signals C1, C2 and C4 in high state to turn off latches 32, 42 and 71 (step 8c). Thereafter, the second chapter pointer address is read out to identify the address where the second chapter starts. In this embodiment, since the address where the second chapter starts is address 0800H, the content stored in the address 0800H of IC card memory 5 is read out. At this time, the read data is a mode monitoring code (step 8d). The mode monitoring code is interpreted and checked by controller 9 to confirm that it is FFF0. If the data is FFF0, that is, if it is confirmed that the mode set by the mode code corresponds to data of the actual data recorded region, the data is read out so that the data is transmitted to video playback processor 6 shown in FIG. 1. The transmitted data are converted into a video signal through a predetermined playback process to be output (step 8f). If the data are consecutively read to reach address FFFFH, it is determined to be an ending position by controller 9 and all playback operations are terminated. If the mode monitoring code does not correspond to the first mode, the information (message) indicating that the data is not reproducible is output to a user.

The recording and playback for modes of other chapters also operate according to the principle as described above.

As described above, the apparatus and method according to the present invention can record and play back audio and/or video data concurrently or separately. In other words, in the present invention, separate video and audio recording regions are not necessary, but the video and/or audio data can be recorded freely any time.

Although the present invention has been described and illustrated in detail, it may be modified and still fall within the spirit and scope of the present invention. Thus, the scope of the present invention should not be limited to the above-described embodiment but should be defined by the appended claims and their equivalents.

What is claimed is:

1. A method for recording data on an IC card memory, wherein said IC card memory comprises a mode code region for storing data for setting a recording or a playback type for at least one chapter, said method comprising the steps of:

selecting a chapter and a recording mode;

recording a code corresponding to said selected mode in the mode code region address corresponding to said selected chapter;

recording a starting address of said selected chapter in a pointer address if a recording key input is detected;

recording a mode monitoring code in said starting address;

recording at least one of audio and video data in at least one address subsequent to said starting address; and recording an end code indicating the end of said selected chapter if data input is completed.

2. A method for reproducing data stored on an IC card memory, wherein said IC card memory comprises a mode code region for storing data for setting a recording or a playback type for at least one chapter, said method comprising the steps of:

selecting a chapter;

reading data of a mode code region corresponding to said selected chapter to determine a mode of said selected chapter said mode code operable to indicate any one of a video only mode, an audio only mode, and a combined video and audio mode;

generating a video, an audio or a composite latch enabling signal in accordance with said determined mode; and outputting video, audio or composite data in response to said latch enabling signal.

3. A method for reproducing data stored on an IC card memory as defined in claim 2, further comprising the steps of:

reading a mode monitoring code in a starting address of said selected chapter prior to said generating step, and proceeding to said generating step only when the mode monitoring code coincides with the determined mode.

4. An IC card memory comprising:

an index region in which intrinsic card information is recorded;

a mode code region in which mode data for setting a recording or a playback mode for at least one chapter is recorded;

a data region in which at least one of audio and video data for each chapter is stored; and a chapter pointer region in which addresses, corresponding to where each chapter starts in said data region is recorded, wherein said IC memory card can operably store video and audio data, and wherein the recorded mode data is operable to indicate any of a video only mode, an audio only mode and a combined video and audio mode.

5. The method for recording data on an IC card memory of claim 1, wherein the IC memory card can operably store video and audio data, and wherein in said step for recording a selected mode code in the mode code region, the recording code is operable to indicate any of a video only mode, an audio only mode and a combined video and audio mode.

6. The method for reproducing data stored on an IC card memory of claim 2, wherein the IC memory card can operably store video and audio data, and wherein in the step for reading the mode code region, the mode code is operable to indicate any of a video only mode, an audio only mode and a combined video and audio mode.

* * * * *